(12) United States Patent
Loew et al.

(10) Patent No.: US 7,105,792 B2
(45) Date of Patent: Sep. 12, 2006

(54) DEVICE FOR COMPENSATING FOR FLUCTUATIONS IN A LIGHT SOURCE AND FILM SCANNER

(75) Inventors: Andreas Loew, Gross-Gerau (DE); Klaus Anderle, Darmstadt (DE)

(73) Assignee: Thomson Licensing, Boulogne-Billancourt (FR)

( * ) Notice: Subject to any disclaimer, the term of this patent is extended or adjusted under 35 U.S.C. 154(b) by 155 days.

(21) Appl. No.: 10/792,293

(22) Filed: Mar. 2, 2004

(65) Prior Publication Data
US 2004/0238720 A1   Dec. 2, 2004

(30) Foreign Application Priority Data
Mar. 4, 2003  (DE) ................. 103 09 325

(51) Int. Cl.
*G01J 1/32* (2006.01)
*G01J 1/44* (2006.01)

(52) U.S. Cl. ............ 250/205; 313/531; 327/514; 250/214 C

(58) Field of Classification Search ........... 250/205, 250/208.1, 214 C; 327/514; 313/531; 315/10, 315/156–159
See application file for complete search history.

(56) References Cited

U.S. PATENT DOCUMENTS

| | | | | |
|---|---|---|---|---|
| 4,254,331 A | * | 3/1981 | Dorman et al. | 250/205 |
| 5,546,041 A | * | 8/1996 | Szajda | 327/512 |

* cited by examiner

*Primary Examiner*—Stephone B. Allen
*Assistant Examiner*—Patrick J. Lee
(74) *Attorney, Agent, or Firm*—Joseph J. Laks; Harvey D. Fried; Patricia A. Verlangie

(57) ABSTRACT

The invention relates to a device for compensating for fluctuations in the light which is emitted by a light source and propogates along a light path. The device has a first light-sensitive sensor. The sensor detects the intensity of the light at a first location along the light path in a spatially resolved manner and generates electrical image signals. Furthermore, a second light-sensitive sensor is provided, which detects the intensity of the light at a second location along the light path and generates electrical output signals.

9 Claims, 4 Drawing Sheets

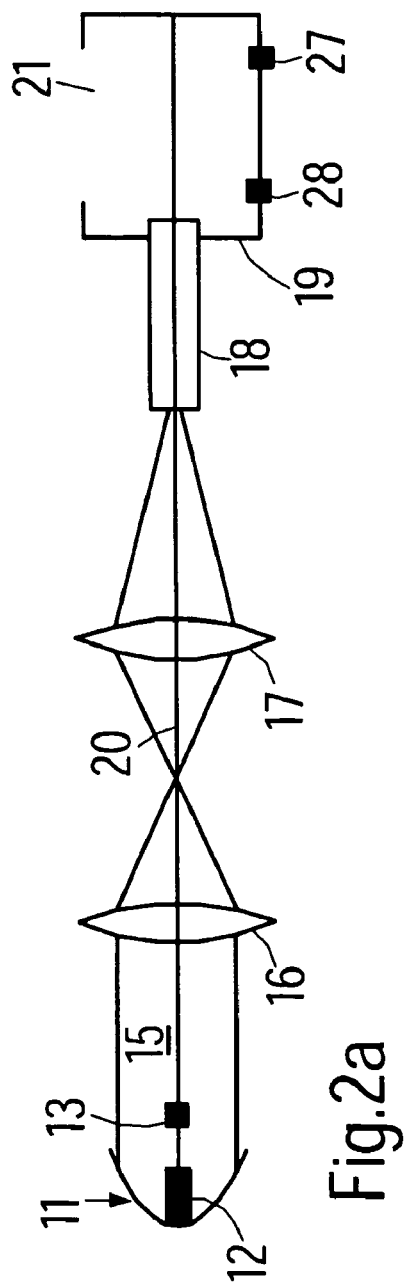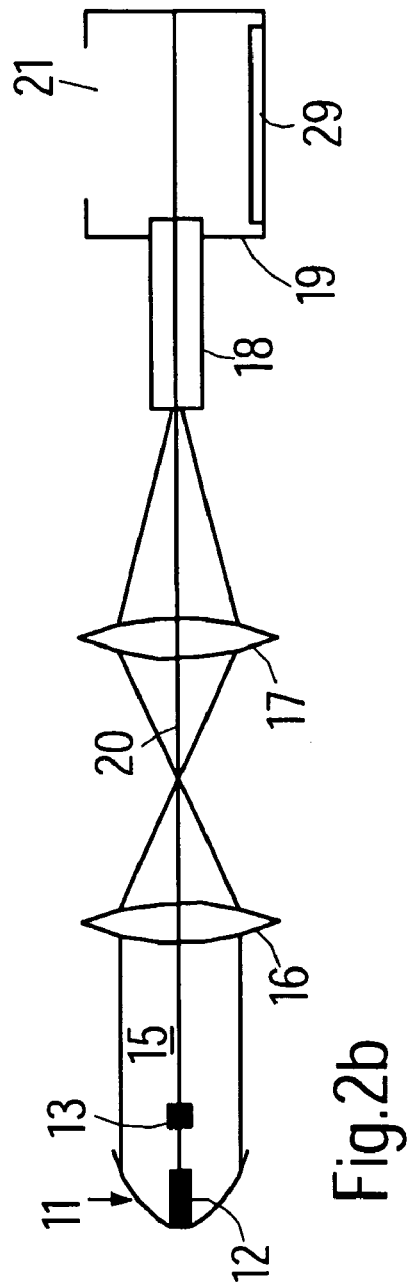
Fig.2a
Fig.2b

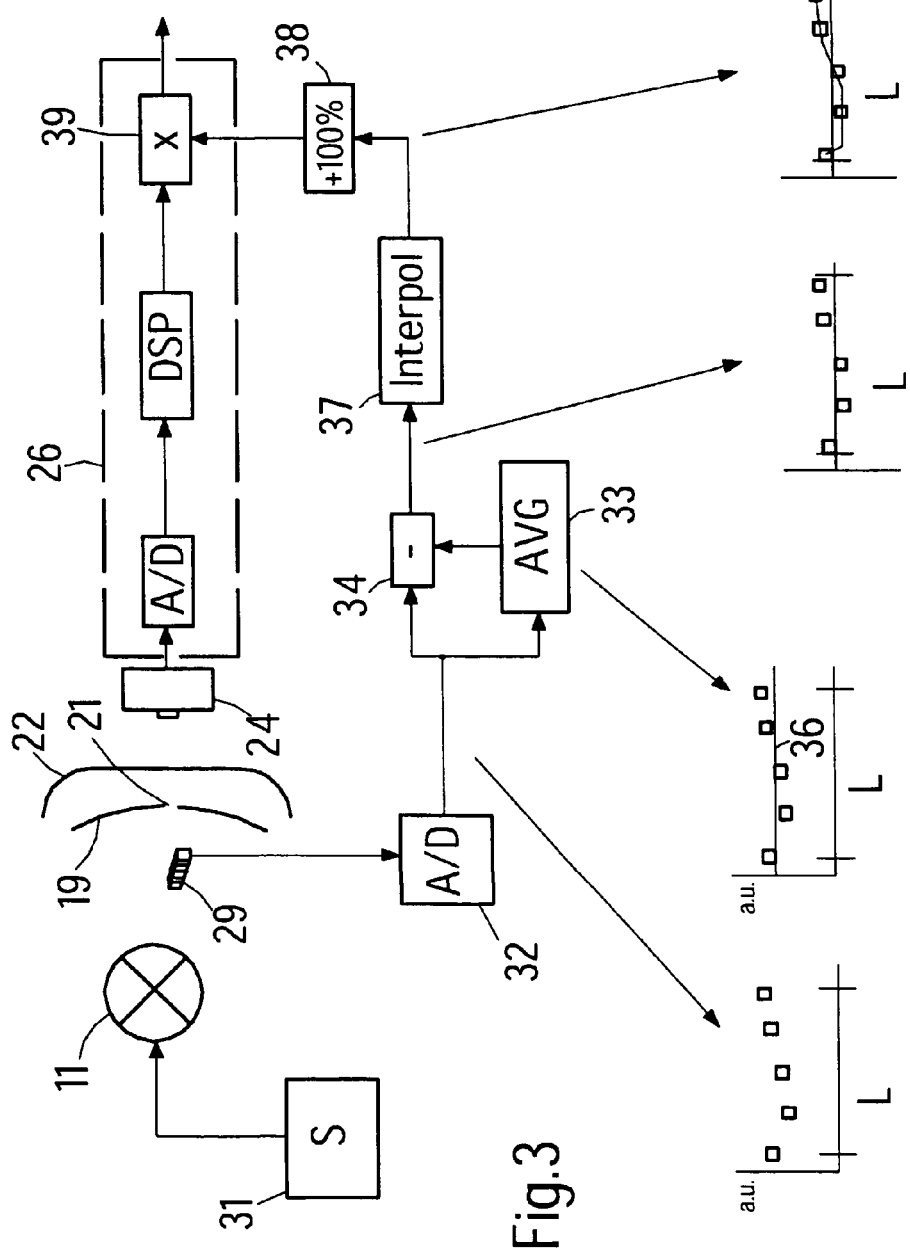

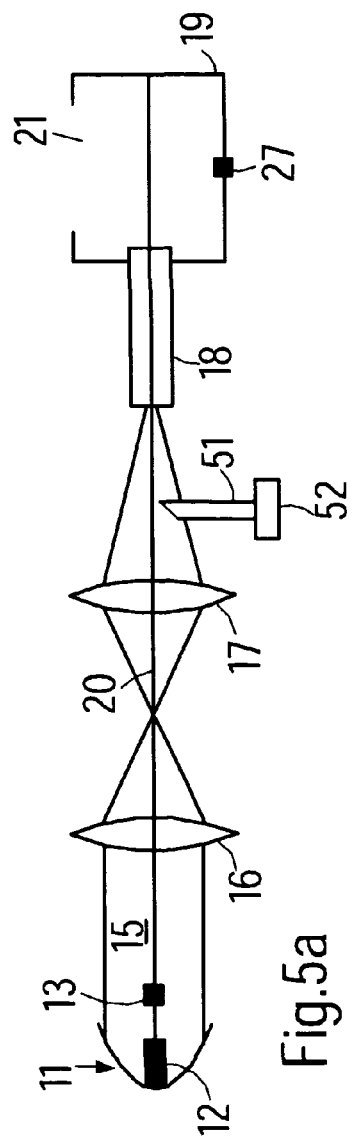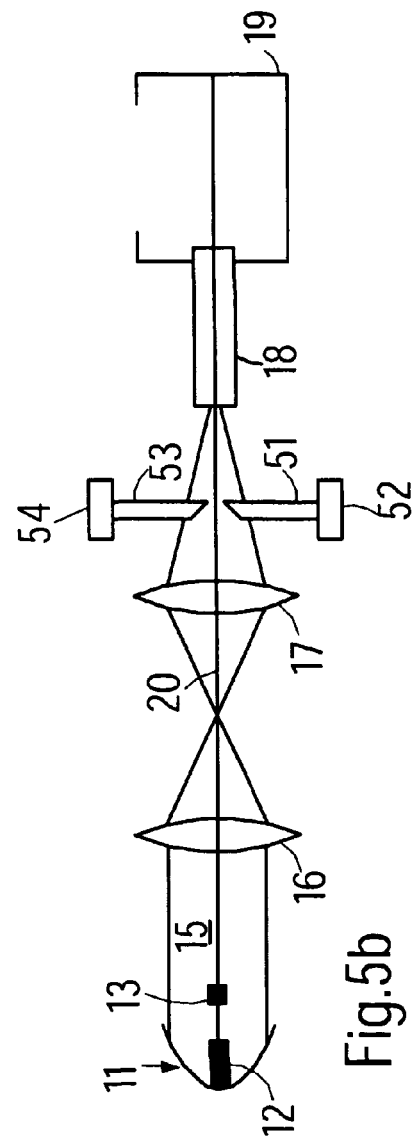

DEVICE FOR COMPENSATING FOR FLUCTUATIONS IN A LIGHT SOURCE AND FILM SCANNER

FIELD OF THE INVENTION

The present invention relates to a device for compensating for fluctuations in the light emitted by a light source. Furthermore, the invention relates to a film scanner equipped with such a device.

The term "fluctuation" is used hereinafter in the sense that it means fluctuations in the spectral and spatial distribution and also in the integrated intensity of the light emitted by the light source. Fluctuations in this general sense occur in gas discharge lamps, for example. In these lamps, the light is emitted by a plasma which burns between the anode and cathode of the discharge lamp. Neither the physical properties of the plasma—such as e.g. the temperature—nor the spatial distribution thereof are completely stable during the operation of the gas discharge lamp. For these reasons, the fluctuations mentioned occur in gas discharge lamps, which fluctuations may prove to be undesirable in specific applications, for example if the gas discharge lamp serves as a light source in the illumination device in a film scanner. During the scanning of films, fluctuations in the illumination of the scanned film lead to undesirable effects in the electrical image signals generated.

BACKGROUND OF THE INVENTION

U.S. Pat. No. 6,219,140 discloses a device for compensating for spectral fluctuations in a light source. The device has photodiodes, in particular, which detect the red, green and blue spectral regions of a light source. The image signals detected by a photodetector are corrected in accordance with the spectral intensity distribution determined by the photodiodes in order to compensate for variations in the image signals which are caused by spectral fluctuations in the illumination.

Taking this as a departure point, it is desirable to provide a device which permits the compensation of variations in an image signal which are caused by fluctuations in the illumination.

SUMMARY OF THE INVENTION

The invention's device for compensating for fluctuations in the light which is emitted by a light source and propagates along a light path has a first light-sensitive sensor. The sensor detects the intensity of the light at a first location along the light path in a spatially resolved manner and generates electrical image signals. Furthermore, a second light-sensitive sensor is provided, which detects the intensity of the light at a second location along the light path and generates electrical output signals. A special feature of the invention now consists in the fact that the second sensor also detects the light intensity in a spatially resolved manner. An evaluation circuit, which receives the output signals of the first sensor and the output signals of the second sensor as input signals, corrects the input signals originating from the first sensor in a manner dependent on the input signal originating from the second sensor. The correction is effected in such a way that the output signals of the evaluation sensor are essentially independent of fluctuations in the light intensity. In this way, it is possible to reduce the influence of illumination variations on the image signals generated by the first sensor.

A linear array sensor may be provided as the second sensor. Since the variations in the illumination intensity only take place locally, it may suffice for the second sensor to have a lower spatial resolution than the first sensor. In one exemplary embodiment, the second sensor is even formed only by two photodetectors spaced apart from one another.

In one development of the invention, the second sensor is suitable for detecting the spectral distribution of the light. In such a configuration of the invention, it is possible also to compensate for spectral fluctuations in the illumination. If the second sensor is formed by two photodetectors, then it is possible for one or both of the detectors to be spectrally sensitive.

The photodetectors of the second sensor may be arranged in an integration cylinder. However, it is also possible for one of the photodetectors to be coupled into the light path of the illumination device by means of an optical coupling element. The various exemplary embodiments permit the device according to the invention to be adapted to a wide variety of applications.

In addition to that, it is also desirable to specify a method for compensating for fluctuations in the illumination.

The invention's method for correcting fluctuations in the light emitted by a light source comprises the following steps:
a) spatially resolved determination of the illumination intensity,
b) calculation of the deviation of the illumination intensity from a nominal desired value, and
c) correction of the image signals output by an image sensor in order to compensate for the deviation of the illumination intensity from the desired value thereof.

The advantage of the method according to the invention consists, inter alia, in the fact that it is thereby also possible to compensate for the influence of spatial fluctuations in the illumination intensity which are manifested neither in an integral nor in a spectral fluctuation in the illumination intensity.

In accordance with one modification of the method according to the invention, it may also be provided that an average value of the illumination intensity is determined. This modification permits integral fluctuations of the illumination intensity also to be taken into account.

In one development of the method, the average value of the illumination intensity is subtracted from the individual values determined in a spatially resolved manner.

In a further modification of the method, interpolation is carried out between the individual values of the illumination intensity.

Finally, it may be provided that the image signals are corrected with a multiplicative correction factor which compensates for different illumination intensities.

Finally, the present invention proposes to provide a film scanner equipped with an illumination device according to the invention.

BRIEF DESCRIPTION OF THE DRAWINGS

Exemplary embodiments of the illumination device according to the invention are illustrated in the drawing, identical or similar elements being provided with the same reference symbols. In the figures:

FIG. 2a shows a first exemplary embodiment of the illumination device according to the invention;

FIG. 2b shows a second exemplary embodiment of the illumination device according to the invention;

FIG. 3 shows a diagrammatic illustration of the illumination device according to the invention, the components for compensating for fluctuations in the illumination intensities additionally being illustrated diagrammatically;

FIGS. 4a to 4d show measured values which occur in the circuit shown in FIG. 3;

FIG. 5a shows a third exemplary embodiment of the illumination device according to the invention, and FIG. 5b shows a fourth exemplary embodiment of the illumination device according to the invention.

DETAILED DESCRIPTION OF PREFERRED EMBODIMENTS

Figure 1:
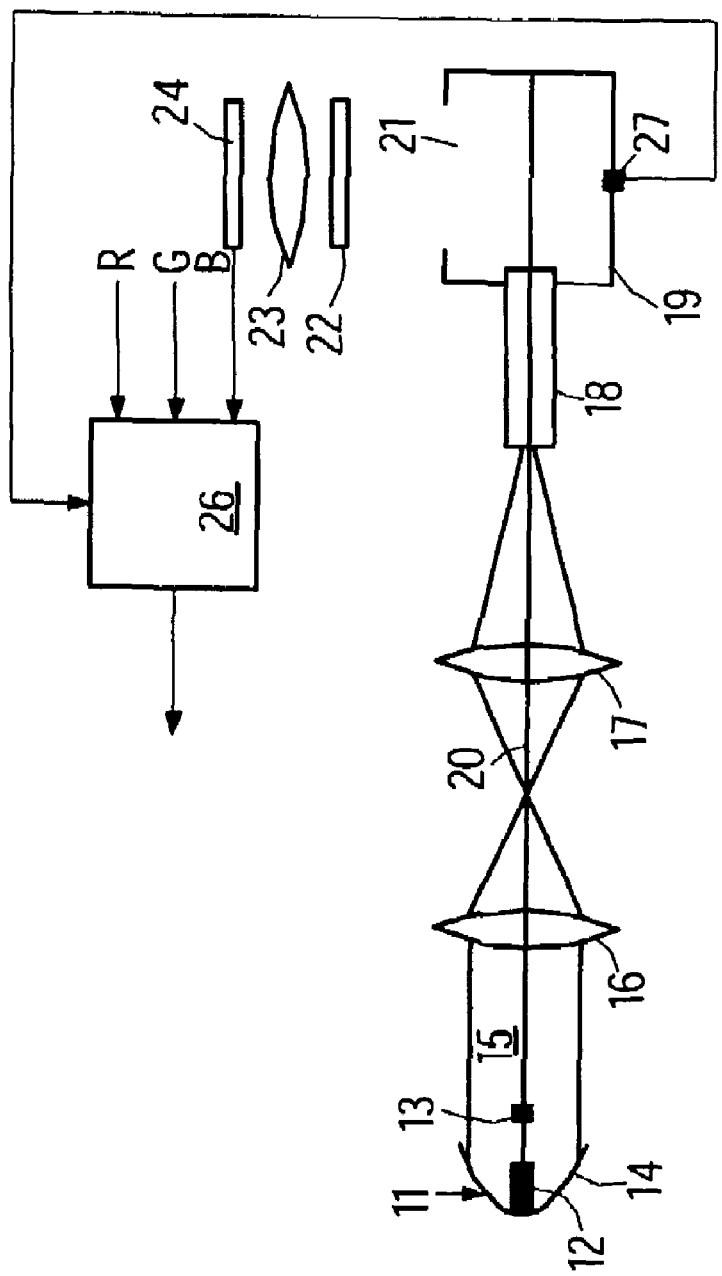
FIG. 1 shows an illumination device as is known from the prior art.

FIG. 1 diagrammatically illustrates the illumination device of a film scanner as is known from the prior art. A gas discharge lamp 11 serves as the light source. A plasma burns between an anode 12 and a cathode 13. The light emitted by the plasma is reflected from a parabolic mirror 14 and leaves the lamp 11 as a parallel beam pencil 15. An imaging device, illustrated in a greatly simplified manner by two convex lenses, 16, 17, images the beam pencil onto an end face of a glass rod 18 acting as an integration rod. The light leaves the integration rod 18 and enters an integration cylinder 19, where it is integrated even further, i.e. made as isotropic as possible. For better illustration of the optical imaging, an optical axis 20 is depicted in FIG. 1. The light leaves the integration cylinder 19 through a gap 21 in order to illuminate a film 22, which is transported past the gap 21 by a film transporting device not illustrated in FIG. 1. An imaging optical arrangement illustrated by a convex lens 23 images the film onto a linear array sensor 24. A beam path through the imaging optical arrangement to an assigned sensor exists for each of the three primary colors red, green and blue. For the sake of clarity, however, FIG. 1 only shows the beam path and the sensor for the color blue. Depending on the functioning and construction, some elements of the imaging optical arrangement do not have all the beam paths running through them. The imaging optical arrangement as such is known in the prior art and is not the subject matter of the present invention.

The output signals of all the linear array sensors are fed to a signal processing unit 26 in order to generate from them video signals in accordance with different selectable formats. Finally, a further sensor 27 is also provided, which outputs an output signal representing the light intensity prevailing in the integration cylinder 19. The output signal of the sensor 27 forms a further input signal for the signal processing unit 26. The signal processing unit uses the last-mentioned signal in order to correct the video output signals in such a way as to compensate for image signal variations caused by fluctuations in the illumination intensity. In concrete terms, the output signal of the linear array sensors is multiplied by a correction factor because the illumination intensity is a factor influencing the amplitude of the output signals of the linear array sensors.

In addition, the lamp current and thus the light flux of the gas discharge lamp 11 can be controlled using the output signal of the sensor 27 by means of a corresponding control loop. This additional control is not illustrated in FIG. 1.

It has been shown in practice that the luminous plasma moves to and fro between the anode 12 and the cathode 13, with the consequence that the spatial distribution of the luminous intensity is likewise not stable. The consequence of such plasma instabilities is that the illumination intensity changes along the linear array sensors. That is the case even when the integrated total intensity and the spectral distribution thereof remain unchanged. This means that with sensors which monitor precisely these variables and derive control signals from them, it is not possible to compensate for the variations in the output signals of the linear array sensors which are caused by plasma movements. In order to compensate for such instabilities, it is necessary to provide a second detector arrangement, which is suitable for detecting the spatial distribution of the illumination intensity.

An exemplary embodiment of the invention with which it is possible to achieve this aim is illustrated in FIG. 2a, identical or similar elements which have already been described in connection with FIG. 1 bearing identical reference symbols. For the sake of clarity, the illumination device is only partly illustrated. The film to be illuminated and the imaging optical arrangement which images the film onto the linear array sensors have been omitted because this part of the device essentially corresponds to the prior art shown in FIG. 1.

An important difference between the exemplary embodiment of the invention shown in FIG. 2a and the prior art is a second sensor 28 arranged in the integration cylinder 19. The sensor 28 lies with the sensor 27 on an imaginary line running parallel to the gap 21 in the integration cylinder 19. The sensors 27 and 28 are positioned such that they lie approximately at the start and at the end, respectively, of an image line to be scanned. The illumination intensity registered by the sensors 27 and 28, respectively, corresponds approximately to the illumination intensity at the start and at the end, respectively, of the image line to be scanned. If different illumination intensities are detected by the sensors, then the image signal is corrected by linear interpolation between the extreme points.

In cases where the measurement points of the sensors 27, 28 do not lie at the beginning and end, respectively, of a scanned image line, the measured illumination intensities are extrapolated up to the beginning and end, respectively, of the image line.

In order to increase the accuracy of the correction, it is possible to increase the number of sensors arranged in the integration cylinder 19 in order to obtain more support points for a correction calculation. It is particularly expedient to provide a linear array sensor 29 for this purpose, as is shown in FIG. 2b. The linear array sensor 29 has a number of sensor elements. Since the illumination intensity changes only relatively slowly as a function of the location in comparison with changes in the image content, it is not necessary for the sensor 29 to have the same spatial resolution as the linear array sensor 24. Nevertheless, it is also possible for the linear array sensor 24 and 29 to have the same spatial resolution.

The steps which are necessary for correcting the image signals in order to compensate for fluctuations in the illumination intensity are explained in more detail below with reference to FIG. 3.

The lamp 11 fed by a power supply 31 illuminates a film 22 through the gap 21 in the integration cylinder 19. The optical signals are converted into electrical signals for each primary color red, green and blue by a respective linear array sensor 24. The linear array sensor may be designed as a CCD sensor ("charge coupled device"). However, the invention is not restricted to this sensor technology. In principle, it is possible to use any other suitable sensor technology. For the sake of better comprehensibility, hereinafter reference is made only to a linear array sensor for one primary color. In actual fact, the operations described below are performed for all three primary colors.

The intensity distribution of the illumination which is measured by the sensor 29 is converted into digital values by an A/D converter 32. By addressing the individual sensor elements of the sensor 29 successively with respect to time, it is possible to assign each digital value to a specific location along a scanned line L. This gives rise to a spatially resolved intensity distribution of the illumination as illustrated in FIG. 4a. The illumination intensity is plotted in arbitrary units on the ordinate. The position of each amplitude value with respect to a line L to be scanned is plotted on the abscissa.

In the circuit from FIG. 3, the output values of the A/D converter 32 are fed on the one hand to an average value stage 33, which calculates the average value from the measured values of all the sensor elements of the sensor 29 and outputs it to a subtraction stage 34. The average value is illustrated as a horizontal line 36 in a diagram in FIG. 4b. On the other hand, the output values of the A/D converter 32 are also fed to the subtraction stage 34. In the subtraction stage 34, the average value is subtracted from the individual values of the A/D converter 32, resulting in an amplitude-reduced distribution in accordance with FIG. 4c.

Once again with reference to FIG. 3, intermediate values interpolated between the individual values of the distribution illustrated in FIG. 4c are calculated in an interpolation stage 37, thereby producing a quasi continuous intensity distribution illustrated in FIG. 4d. The intensity distribution in FIG. 4d specifies a specific intensity for each pixel of the linear array sensor 24. Each illumination value determined for a specific pixel in this way is added with inverted signs to a value which corresponds to a nominal 100% value of the illumination. The deviation of the actual illumination intensity from a nominal illumination intensity is determined in this way. The computation steps are effected in a processing stage 38, the output signal of which is combined multiplicatively as correction factor pixel by pixel with the image signals in a multiplier 39. The output signals of the multiplier 39 are image signals which are compensated with respect to fluctuations in the illumination intensity. A smaller image signal amplitude caused by a lower illumination intensity is compensated for in this way. Equally, a larger image signal amplitude caused by a higher illumination intensity is compensated for in a corresponding manner. For specific applications, it may be expedient additionally to provide a low-pass filter (not illustrated in FIG. 3) between the subtraction stage 34 and the interpolation stage 37.

FIG. 5a shows a further exemplary embodiment of the invention which deviates from that illustrated in FIG. 2a with regard to the sensors for detecting the illumination intensity. In addition to a sensor 27 arranged in the integration cylinder 19, a sensor 52 is coupled into the light pencil imaged onto the integration rod 18 by means of an optical coupling element 51. That part of the light pencil which is detected by the sensor 52 falls onto a different location of the scanned line than the part which is detected by the sensor 27. In this way, it is possible in an entirely corresponding manner to that in the exemplary embodiment illustrated in FIG. 2a to interpolate the intensities for each pixel of the linear array sensor 24 on the basis of the two measured values, or to extrapolate them as required.

A further exemplary embodiment of the invention is illustrated in FIG. 5b. In contrast to the exemplary embodiment shown in FIG. 5a, a further sensor 54 is coupled to the light pencil by means of yet another optical coupling element 53. That part of the light pencil which is respectively detected by the sensors 52 and 54 is imaged onto different locations of the scanned image line, so that the interpolation or extrapolation described in connection with FIG. 5a can be performed for the pixel-by-pixel determination of the illumination intensity. In a modification of the exemplary embodiments of the invention which are illustrated in FIGS. 5a and 5b, the two sensors 52, 54 are designed as so-called RGB sensors, which also detect the spectral distribution of the measured light intensity. Sensors suitable for this purpose are MCS 3 AT/BT from Laser Components (Olchingen, Germany) or S 7505 from Hamamatsu. Such RGB sensors may also be used as sensors 27, 28 in a modification of the exemplary embodiment of the invention which is shown in FIG. 2a.

In the description although reference has always been made to linear array sensors for determining the image data, the invention can nevertheless also be applied to area sensors provided that enough support points of the illumination intensity are determined which permit the calculation of the illumination intensity for the entire sensor area.

Even though the description has repeatedly made mention of linear interpolation or extrapolation, other mathematical methods are also suitable, in principle, for embodying the invention. The person skilled in the art will make his choice of a specific method dependent on the concrete application.

What is claimed is:

1. A device for compensating for fluctuations in the light which is emitted by a light source and propagates along a light path, comprising:
    a first light-sensitive sensor, which detects the intensity of the light at a first location along the light path in a spatially resolved manner and generates electrical image signals,
    a second light-sensitive sensor, which detects the intensity of the light at a second location along the light path and generates electrical output signals, wherein the second sensor detects the light intensity in a spatially resolved manner,
    an evaluation circuit is provided, which receives both the output signals of the first sensor and the output signals of the second sensor as input signals and corrects the input signals originating from the first sensor in a manner dependent on the input signals originating from the second sensor in such a way that the output signals of the evaluation circuit are essentially independent of fluctuations in the light intensity.

2. The device as claimed in claim 1, wherein the second sensor is designed as a linear array sensor.

3. The device as claimed in claim 1, wherein the second sensor has a lower spatial resolution than the first sensor.

4. The device as claimed in claim 3, wherein the second sensor is formed from two photodetectors spaced apart from one another.

5. The device as claimed in claim 1, wherein the second sensor is suitable for detecting the spectral distribution of the light.

6. The device as claimed in claim 4, wherein the second sensor is suitable for detecting the spectral distribution of the light.

7. The device as claimed in claim 4, wherein the photodetectors are arranged in an integration cylinder.

8. The device as claimed in claim 4, wherein one of the photodetectors is coupled into the light path of the illumination device by means of an optical coupling element.

9. A film scanner, which is equipped with an illumination device as claimed in claim 1.

* * * * *